United States Patent [19]

Harshberger, Jr.

[11] 4,085,354
[45] Apr. 18, 1978

[54] TAPE TRANSPORT DYNAMIC BRAKE

[75] Inventor: Robert P. Harshberger, Jr., San Jose, Calif.

[73] Assignee: Ampex Corporation, Redwood City, Calif.

[21] Appl. No.: 682,377

[22] Filed: May 3, 1976

[51] Int. Cl.² .............................................. H02P 3/14
[52] U.S. Cl. ............................................ 318/87; 318/7; 318/380
[58] Field of Search ................. 318/375, 88, 89, 90, 318/380, 379, 7, 87, 6

[56] References Cited

U.S. PATENT DOCUMENTS

| | | | |
|---|---|---|---|
| 1,696,599 | 12/1928 | Forsberg | 318/89 |
| 2,317,254 | 4/1943 | Cowin | 318/88 |
| 2,784,366 | 3/1957 | Steele | 318/379 |
| 3,794,898 | 2/1974 | Gross | 318/380 |

Primary Examiner—B. Dobeck
Attorney, Agent, or Firm—Charles M. Carman, Jr.

[57] ABSTRACT

A dynamic brake for the supply reel motor of a tape transport. Upon power failure, the motor is coupled as a generator to supply current to a lamp, which functions as a substantially constant current load, and produces a substantially constant braking torque upon the supply reel.

6 Claims, 1 Drawing Figure

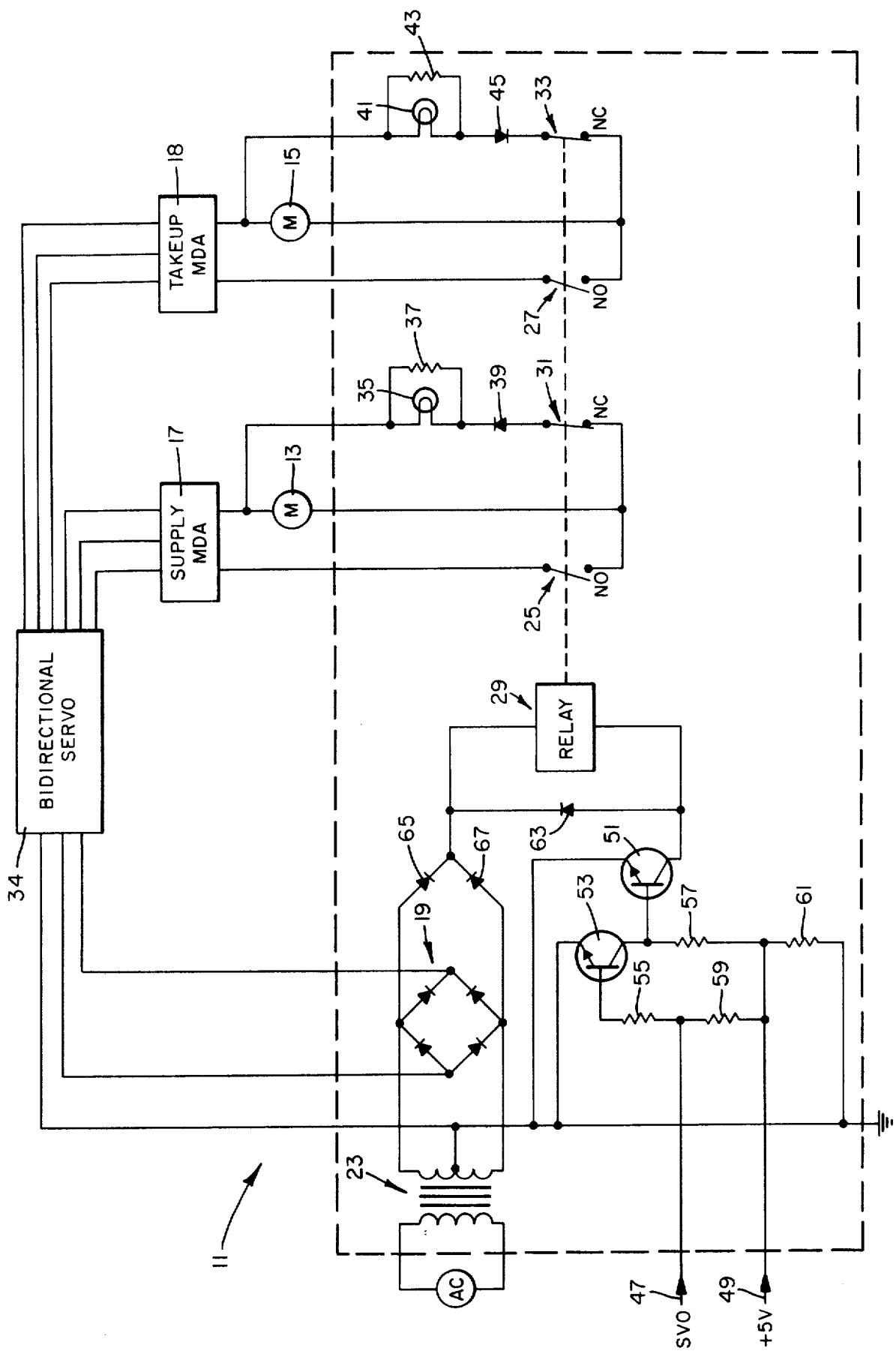

TAPE TRANSPORT DYNAMIC BRAKE

BACKGROUND OF THE INVENTION

This invention relates to brakes for magnetic tape transports, and particularly to dynamic brakes for the driving motors thereof.

The stopping of a magnetic tape transport requires that the reels, and sometimes the capstan, be braked in order to prevent the tape coming off the supply reel from forming or "throwing" loops and catching in the mechanism. To avoid the use of cumbersome and expensive mechanical brakes, various schemes have been attempted for operating the take-up and supply reel motors themselves to produce the desired braking effect.

U.S. Pat. No. 3,906,299 discloses such a system in which the take-up reel upon being switched off causes the supply reel to be energized in reverse to brake the tape.

U.S. Pat. No. 3,809,329 discloses a system in which the motors charge condensers during normal operation, and the condenser is then discharged to energize the supply reel motor in reverse during stopping to brake the tape.

U.S. Pat. No. 3,895,277 teaches braking only for a capstan motor, but mentions that it is possible to short the armature leads during the stopping period, causing the motor to act as its own brake.

Accordingly, it is an object of the present invention to provide means for operating the motors of a tape transport as effective brakes during stopping or upon power failure to the transport.

BRIEF DESCRIPTION OF THE INVENTION

This and other objects are accomplished in a system in which a dynamic brake for the supply reel motor of a tape transport is utilized. Upon power falure, the motor is coupled as a generator to supply current to a lamp, which functions as a substantially constant current load, and produces a substantially constant braking torque upon the supply reel.

DESCRIPTION OF THE DRAWING

The sole FIGURE is an electronic circuit diagram illustrating the structure of the invention.

DESCRIPTION OF THE PREFERRED EMBODIMENTS

Referring now to the drawing, there is shown a circuit including a power supply 11 for a pair of reel motors 13 and 15 for a magnetic tape transport of a type well known in the art and not here shown. The motor 13 will be termed the "supply reel motor" and the motor 15 the "take-up reel motor" in recognition of their respective functions during forward tape movement as for play, or fast forward modes; but it will be understood that during reverse tape movement as for rewind mode, the motor 13 and its associated reel will actually be functioning to take up tape while the motor 15 and its associated reel will be functioning to supply tape. The respective motors are driven through motor drive amplifiers 17 and 18, from a source of direct current 19, which in turn is powered from an outside source 21 of alternating current through a transformer 23.

It is desired first of all to ensure that the reels will be braked gently to a halt in the event of power failure, in such a manner as to prevent the throwing of a tape loop by the supply reel overrunning the take-up reel, but at the same time without excessive shock to the tape that is stretched between the reels.

Accordingly, the motors are energized from the amplifiers 17, 18 through respective normally-open contacts 25 and 27 of a relay 29 that is energized during movement of the tape in a manner to be described more fully hereinafter. Upon energization of relay 29, the contacts 25, 27 are closed to complete the circuits between amplifiers 17, 18 and motors 13. 15. Concurrently, a pair of normally closed contacts 31, 33 of the relay 29 are opened; these contacts are in circuits in parallel with the motors 13, 15, respectively, which circuits do not come into use until a "stop" command is given to the apparatus, as will be described more fully hereinafter, or until a power failure occurs. In either event, the relay 29 is de-energized, and contacts 25, 27 are opened and contacts 31, 33 are closed to bring into play the dynamic braking circuits.

The dynamic braking circuits function as follows. Assuming that the tape is traveling in forward direction, as dictacted by the bidirectional servo 34, when the contacts 31, 33 are closed, then motor 13 is in fact the supply reel motor and performs the braking action. In the braking circuit across the motor 13 is coupled a lamp 35 in parallel with a resistor 37; and a steering diode 39 is connected in series with lamp 35 and contacts 31. The steering diode 39 is arranged to pass the current that is generated by motor 13 as it continues to revolve in its supply reel direction, i.e., when tape is traveling in forward mode, but to block any current that may be generated by the motor when it has been acting as a take-up reel drive, revolving in the opposite direction, with the tape moving in reverse direction. When current is passed, the lamp 35 is energized and operates as a load upon the motor 13 (now functioning as a generator), braking it to a standstill. When current is not passed by diode 39, i.e., when motor 13 has been functioning as a take-up reel, then it coasts more freely, being unloaded, and the braking function is performed by motor 15. Thus no tape loop is thrown.

Motor 15 has an identical circuit for a lamp 41, resistor 43 and diode 45, except that the diode 45 is reversed, causing current to be blocked in forward mode but passed in reverse mode.

Thus either motor may be the braking generator when it is coupled to the supply reel, but neither performs braking when coupled to the take-up reel.

The advantages of using the lamps 35, 41 as loads instead of merely shorting the motor out, either directly or through a resistor, as in the prior art, is that the prior art procedure produces braking torque as a direct function of generated voltage ($t = Kv$ where $t$ is torque, $v$ is voltage and $K$ is a constant); whereas with the lamp as load, braking torque is produced as a function of approximately the square root of the generated voltage, or:

$$t = Kv^{-1/2}$$

Thus, while the prior art system may be quite satisfactory when the speed involved is low, it may result in broken tape at higher speeds. The present invention produces a gentler initial braking action than the prior art, but approaches the same braking force as it dies out.

A third condition may also produce a braking action on the reels even though power may not be shut off. The reel servos, not here shown in detail, have an "off" state and two "on" states, "high" and "Low." The servos remain in low state when the reels are operating satisfactorily under control, but go to "high" if they lose control, as for example, if some outside force interferes with the rotation of one of the reels. To energize the relay 29, a "servo-on" signal 47 is needed, together with a small voltage 49, which control a pair of transistors 51 and 51 through resistors 55, 57, 59 and 61, and a diode 63 in parallel with relay 29, coupled to receive voltage from the transformer 23 through diodes 65 and 67. Transistors 51, 53 are arranged so that to complete the energizing circuit for relay 29, transistor 51 must be "on," which condition is controlled by transistor 53 being "off." This condition is brought about by the SVO signal 47 in "low" state. When signal 47 goes "high," representing a loss of control by the servos, then transistor 53 goes "on" and transistor 51 goes "off," de-energizing the relay. The servos are arranged so that they stay "high" or "off" until reset, whenever a malfunction takes place.

Thus there has been described a dynamic brake for the supply reel motor of a tape transport. Upon power failure, the motor is coupled as a generator to supply current to a lamp, which functions as a substantially constant load, and produces a substantially constant braking torque upon the supply reel.

I claim:

1. A dynamic brake for a motor, comprising:
   means including a lamp and constituting a generator load that varies substantially inversely exponentially with generator velocity; and
   means operable upon power stoppage to said motor for coupling said motor as a generator to operate said load.

2. A dynamic brake as recited in claim 1, wherein:
   a relay is provided, with first normally-closed contacts in the energization circuit of said lamp so that said lamp is coupled to be operated as a load when said relay is not energized and said motor is rotating as a generator; and
   a power supply for said motor is also provided, said relay being coupled to said power supply for energization concurrently with said motor;
   whereby said relay is de-energized and said first contacts are closed whenever power to said motor fails or is intentionally interrupted.

3. A dynamic brake as recited in claim 2, wherein a unidirectional-current diode element is coupled in the energization circuit of said lamp for permitting said lamp to be operated as a load by said motor functioning as a generator only in one of two predetermined directions of rotation.

4. A dynamic brake as recited in claim 3, wherein a servo control means is provided for said motor, and is coupled in the energization circuit for said relay so as to permit energization of said relay only when said servo control means is in the "on" condition and has said motor under control;
   whereby said motor is stopped and braked to a halt whenever said servo control means loses control or is shut off.

5. A dynamic braking system for the reel motors of a magnetic tape transport, comprising:
   means constituting a generator load varying substantially inversely exponentially with generator; and
   means operable upon power stoppage to said motors for coupling one of said motors as a generator to operate said load;
   said last-named means being further operable to select the motor for the reel from which tape is unwinding for said coupling, in both forward and reverse directions of tape motion.

6. A dynamic braking system as recited in claim 5, wherein said load means comprises a lamp associated with each motor and said coupling means couples only the lamp and motor associated with the reel from which tape is unwinding, in both directions of rotation.

* * * * *